(12) United States Patent
Jensen et al.

(10) Patent No.: US 6,501,960 B1
(45) Date of Patent: Dec. 31, 2002

(54) RF TEST CONNECTOR PLUG LOCKING SYSTEM

(75) Inventors: Derek Edward Jensen, Libertyville, IL (US); Kenneth Wayne Carlson, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/434,747

(22) Filed: Nov. 5, 1999

(51) Int. Cl.[7] .................................................. H04B 1/38
(52) U.S. Cl. ........................ 455/550; 455/575; 343/906
(58) Field of Search ........................ 455/90, 575, 351, 455/347, 550, 425; 343/702, 906, 439

(56) References Cited

U.S. PATENT DOCUMENTS 5,142,295 A * 8/1992 Dourson .................... 343/903
5,577,269 A * 11/1996 Ludewig ..................... 455/90

* cited by examiner

*Primary Examiner*—William Trost
*Assistant Examiner*—Sharad Rampuria
(74) *Attorney, Agent, or Firm*—Michael C. Soldner; Randall S. Vaas

(57) ABSTRACT

An RF test connector plug (30) for securing an opening (32) to access an RF test connector (33) for testing an electrical connection of an antenna (26) of a radio communication device (20) that allows testing of an antenna connection and prevents removal by a user. First and second leg members (40, 46) of the RF test connector plug (30) extend upward from a lower portion (38) shaped to conform to a curvature of an outer surface of the radio communication device. First and second tabs (52, 54) are positioned at the opening (32) to secure and to position the first leg member (40) and the second leg member (46), respectively, along the antenna (26) to prevent rotation of the RF test connector plug (30) within the opening (32).

6 Claims, 5 Drawing Sheets

RF TEST CONNECTOR PLUG LOCKING SYSTEM

FIELD OF THE INVENTION

The present invention generally relates to a radio communication device, and more particularly to a plug assembly for controlling access to an RF test connector of a radio communication device.

BACKGROUND OF THE INVENTION

A radio communication device includes an antenna that is electrically connected to circuitry located in a housing portion of the radio communication device. In order to test whether the antenna is operating properly during manufacture of the radio communication device, an RF test connector is positioned on the radio communication device that enables test equipment to be directly coupled to test the connection of the antenna. Since it is desirable for the antenna connection be tested in the factory, while the radio communication device is in a filly assembled, closed state, the RF test connector must be accessible from outside the radio communication device. For example, radio communication devices are known that include a coaxial type RF test connector, located either along the upper back portion of the radio device or the bottom portion of the radio device, to enable the antenna connection to be tested with the radio communication device in the fully assembled, closed state.

In addition, radio communication devices are also known in which the RF test connector is made available from the outside by being positioned so as to be accessible via an opening located along the outer surface of the radio device. Such radio communication devices include an RF test connector plug, such as a plastic plug shaped to fill the opening, or a common rubber plug, that is inserted within the opening during periods when the antenna connection is not being tested. The RF test connector plug is used to both cosmetically improve the overall appearance of the radio communication device and to prevent debris from entering the opening and corrupting operation of the antenna. However, these RF test connector plugs can be easily removed by a user, enabling the user to access the RF test connector and increasing the likelihood for debris to accumulate within the opening.

Accordingly, what is needed is an RF test connector plug that, in addition to enabling a radio communication device to be tested in a closed condition during the manufacture of the radio communication device, prevents the RF test connector from being accessed by a user after the manufacturing process.

DETAILED DESCRIPTION OF THE PREFERRED EMBODIMENT

Figure 1:
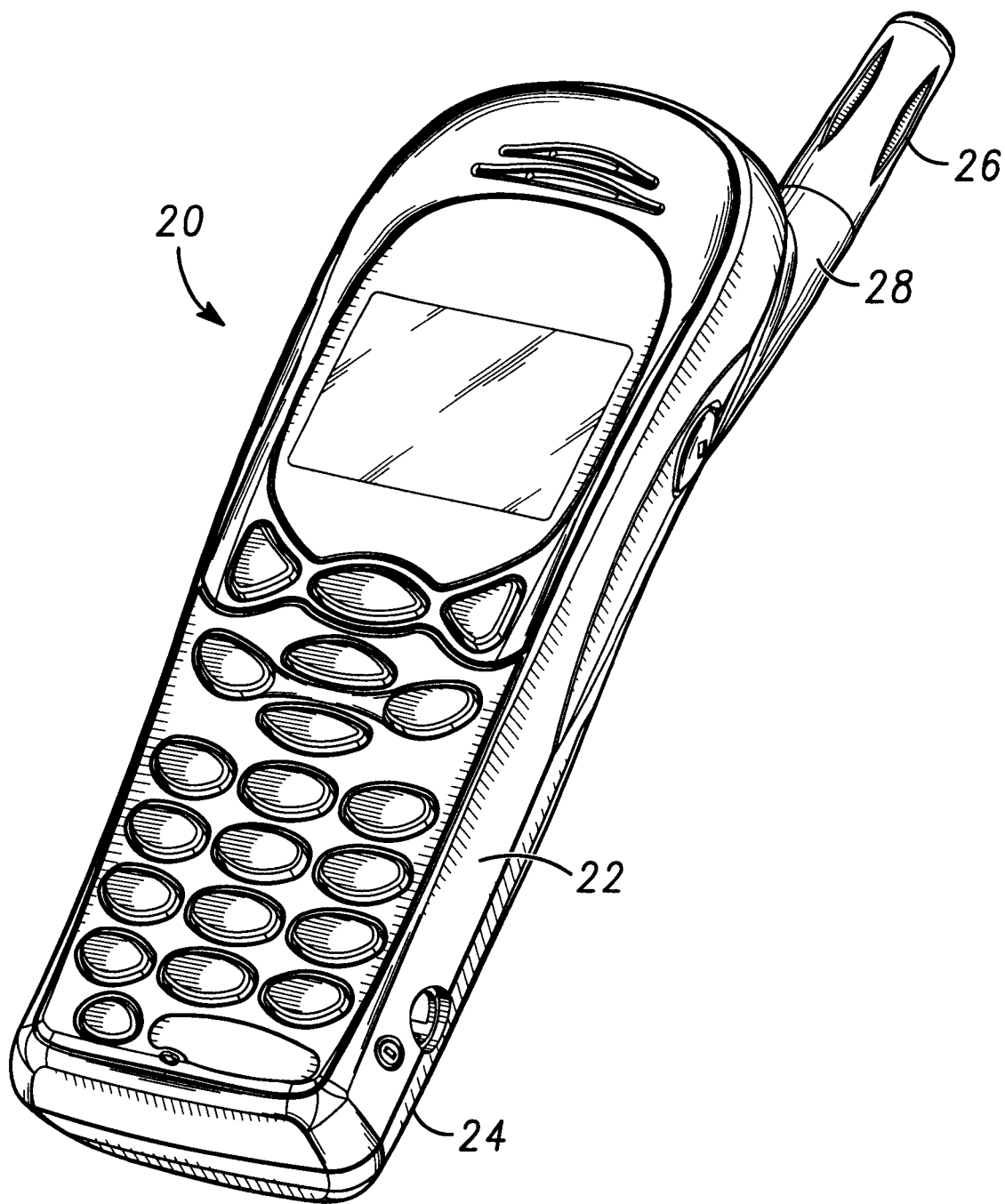
FIG. 1 is a front perspective view of a radio communication device.
Figure 2:
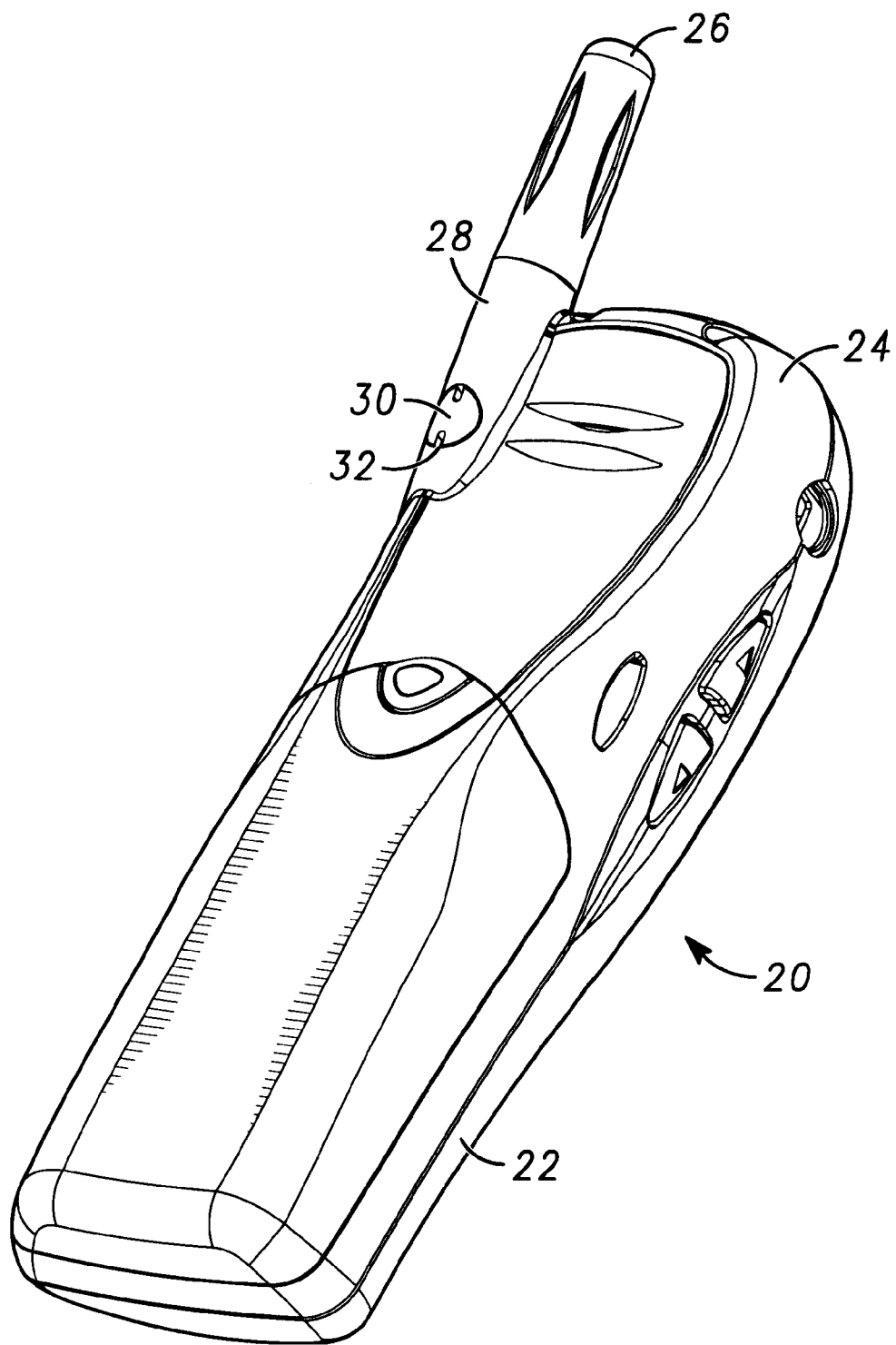
FIG. 2 is a rear perspective view of a radio communication device that includes an RF test connector plug according to the preferred embodiment of the present invention.
Figure 3:
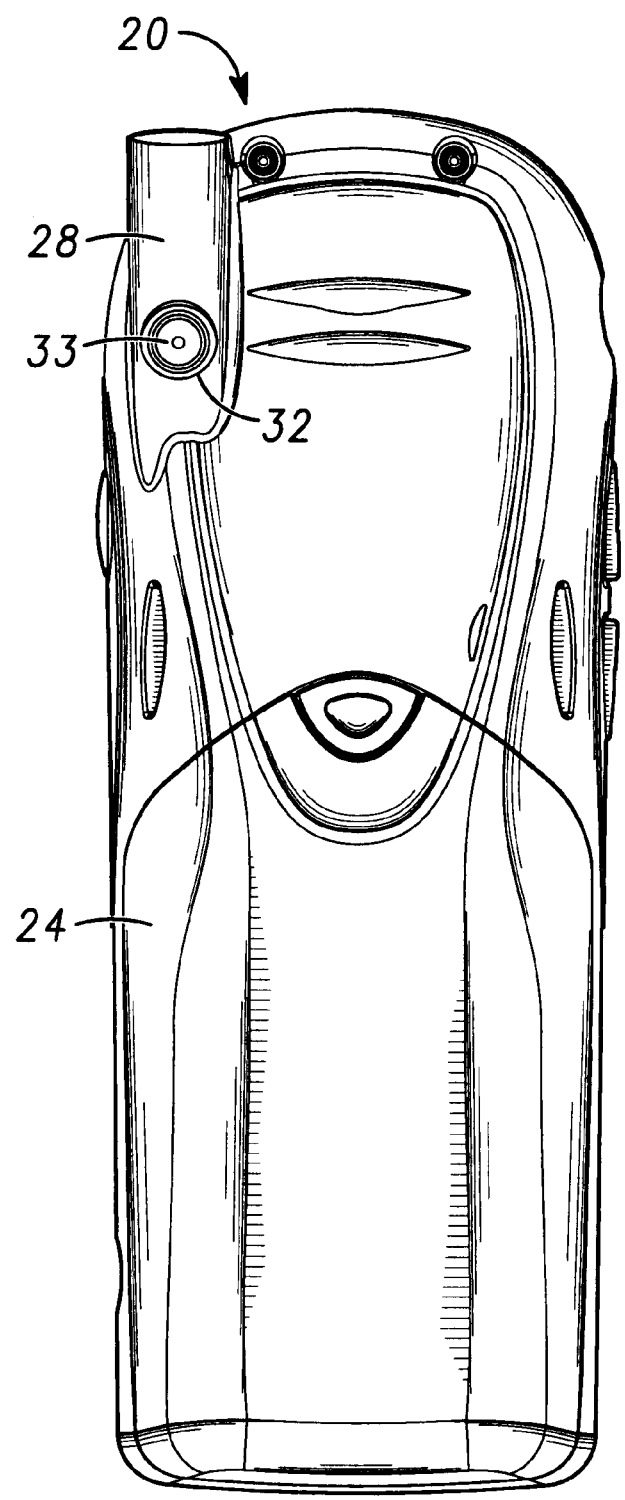
FIG. 3 is a top view of a rear housing of a radio communication device.

As illustrated in FIGS. 1 and 2 of the present invention, a radio communication device 20, such as a wireless telephone for example, includes a front housing 22, a rear housing 24, and an antenna 26. The antenna 26 extends from the rear housing 24 and is attached to the radio communication device 20 by being inserted at a connecting portion 28 of the rear housing 24. As illustrated in FIG. 3, an RF test connector 33 is accessible through an opening 32 located on the connecting portion 28 and is used for testing the connection of the antenna 26 during the manufacture of the radio communication device 20. As illustrated in FIG. 2, an RF test connector plug 30 is inserted in the opening 32, as will be described below, to prevent access to the RF test connector 33.

Figure 4:
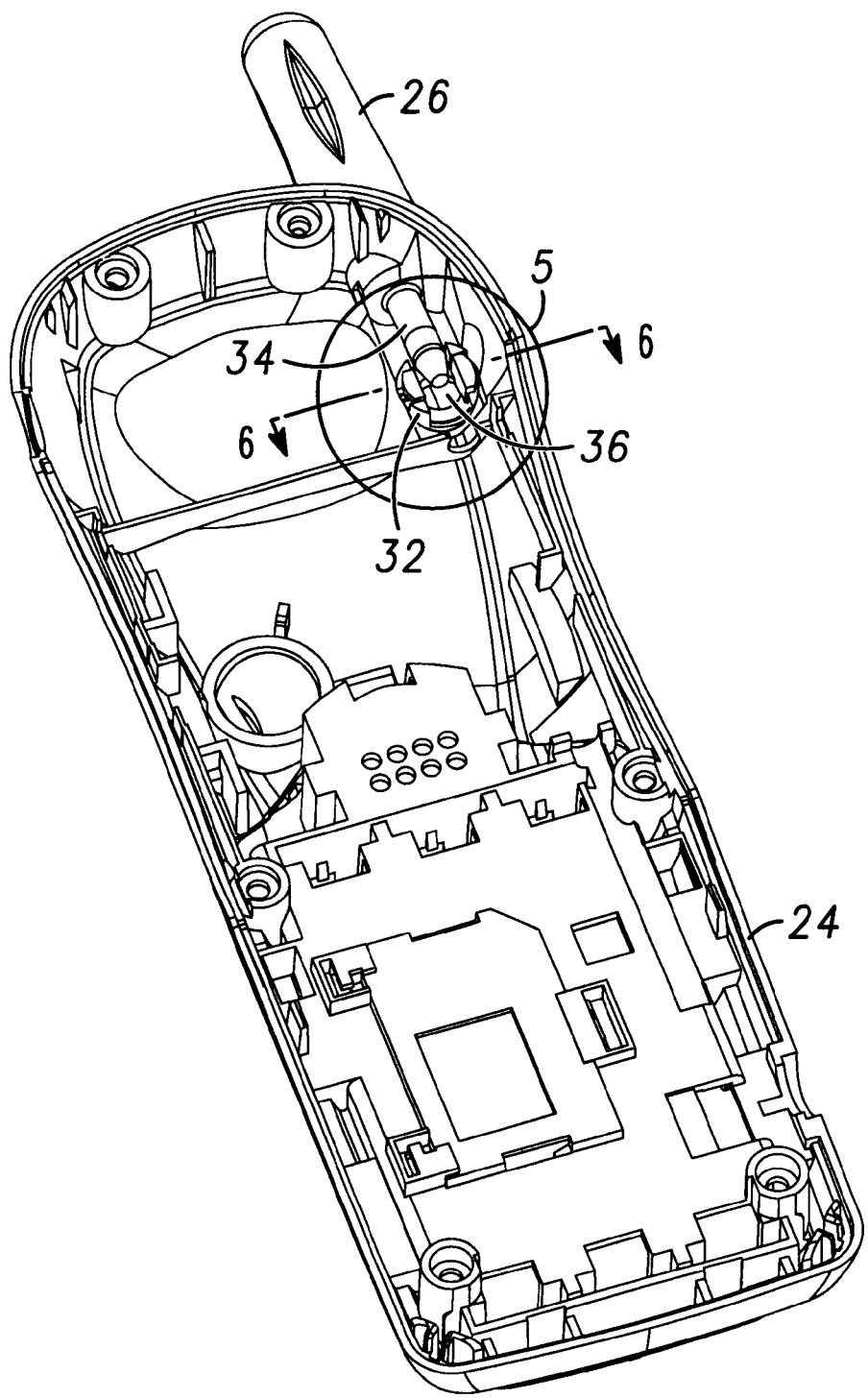
FIG. 4 is a top view of a rear housing of a radio communication device that includes the RF test connector plug according to the preferred embodiment of the present invention.

FIG. 4 is a top view of the rear housing 24 of the radio communication device 20. As illustrated in FIG. 4, when the antenna 26 is inserted in the connecting portion 28, a shaft 34 of the antenna 26 is positioned within a channel 36 formed in the rear housing 24, directly above the opening 32.

Figure 5:
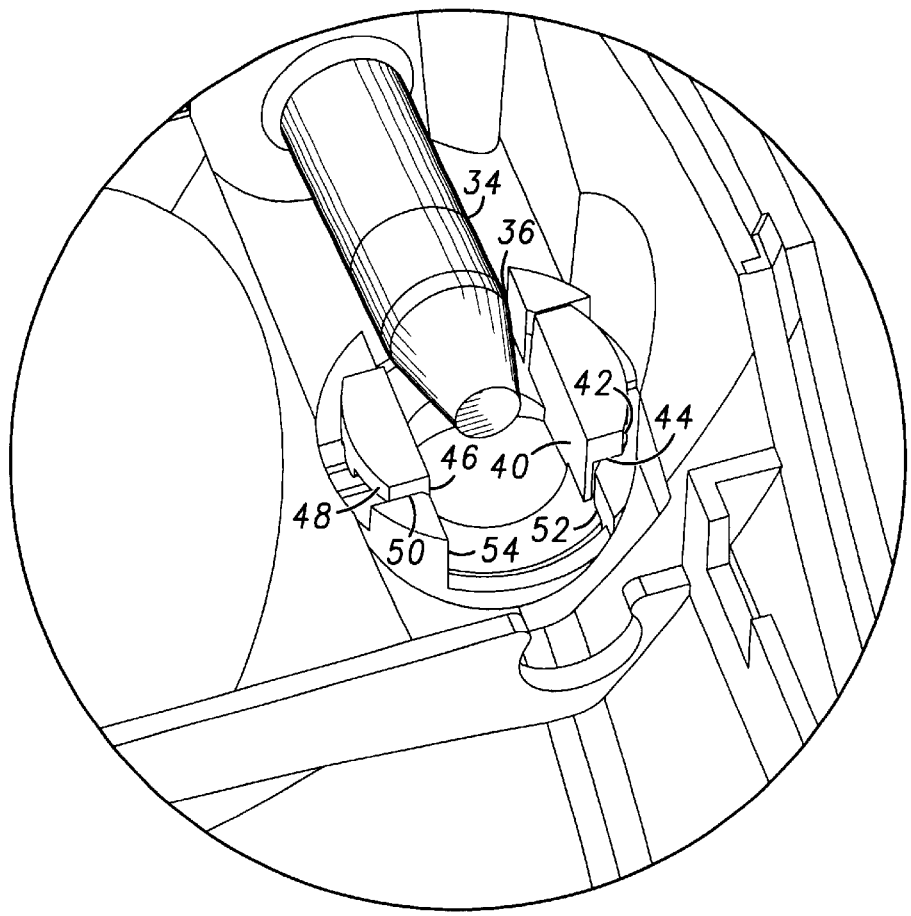
FIG. 5 is a partial exploded view of the RF test connector plug positioned within an opening according to the preferred embodiment of the present invention.
Figure 6:
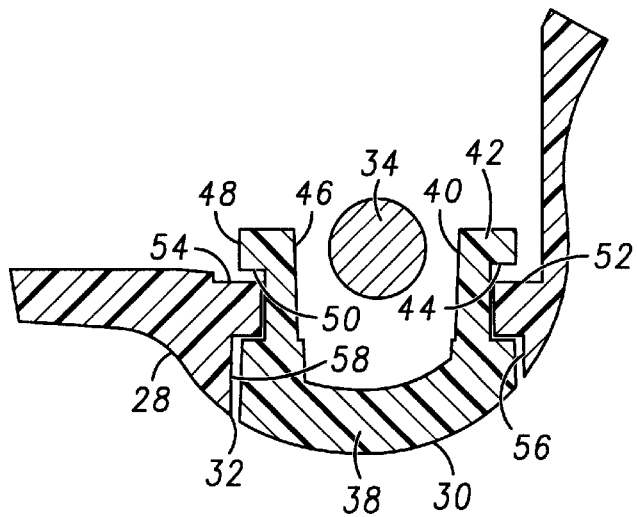
FIG. 6 is a cross-sectional view of the RF test connector plug according to the preferred embodiment of the present invention, taken along section lines 6—6 of FIG. 3.

As illustrated in FIGS. 5 and 6, the RF test connector plug 30 includes a lower portion 38 which is shaped to conform to a curvature of the connecting portion 28 of the rear housing 24 when the RF test connector plug 30 is inserted in the opening 32. A first leg member 40 extends upward from the lower portion 38 to an inward extending first flange portion 42 so that the first leg member 40, the lower portion 38, and the first flange portion 42 form a first slot 44. Similarly, a second leg member 46 extends upward from the lower portion 38 to an inward extending second flange portion 48 so that the second leg member 46, the lower portion 38, and the second flange portion 48 form a second slot 50.

As illustrated in FIG. 6, a first tab 52 and a second tab 54 extend from the connecting portion 28 within the opening 32 to form a first gap 56 and a second gap 58, respectively, for receiving the lower portion 38 of the RF test connector plug 30. As illustrated in FIG. 5, the first tab 52 and the second tab 54 at the opening 32 of the connecting portion 28, along with the first leg member 40 and the second leg member 46 of the RF test connector plug 30, form the channel 36 for receiving the shaft 34 of the antenna 26.

According to the present invention, the connection of the antenna 26 is tested during the manufacture of the radio communication device 20 with the radio communication device 20 in an assembled, closed state by accessing the RF test connector 33 through the opening 32 with the RF test connector plug 30 and the antenna 26 removed. Upon completion of the testing procedure, the RF test connector plug 30 is inserted within the opening 32 with the first leg member 40 and the second leg member 46 aligned to be positioned within the channel 36, and the RF test connector plug 30 is then rotated so that the first tab 52 and the second tab 54 at the opening 32 slide within the respective first slot 44 and second slot 50 of the RF test connector plug 30. As a result, the first flange portion 42 and the second flange portion 48 of the RF test connector plug 30 are positioned, respectively, over the first tab 52 and the second tab 54 of the connecting portion 28 to secure the RF test connector plug 30 within the opening 32.

After the RF test connector plug 30 is secured within the opening 32 as described above, the antenna 26 is inserted within the connecting portion 28. As a result, as illustrated in FIG. 5, the shaft 34 of the antenna 26 prevents the rotation of the first and second leg members 40 and 46 to lock the RF test connector plug 30 within the opening 32 so that the RF test connector plug 30 cannot be removed from the opening 32. In this way, in addition to both cosmetically improving the overall appearance of the radio communication device 20 and preventing debris from entering the opening 32, the RF test connector plug 30 of the present invention prevents an end user from being able to remove the RF test connector plug 30 and deters access to the RF test connector 33. At the same time, the RF test connector plug 30 of the present invention allows the connection of the antenna 26 to be tested with the radio communication device 20 in a fully assembled, closed state.

While a particular embodiment of the present invention has been shown and described, modifications may be made. It is therefore intended in the appended claims to cover all such changes and modifications which fall within the true spirit and scope of the invention.

What is claimed is:

1. A test connector plug to secure an opening for accessing a radio frequency (RF) test connector for testing an electrical connection of an antenna of a radio communication device, the radio communication device including a housing and the test connector carried in the housing, the housing including the opening for accessing the RF test connector and at least one tab positioned adjacent to the opening, the plug comprising:

a first portion shaped to conform to a curvature of an outer surface of the radio communication device housing whereby said first portion provides a conforming surface for closing the opening in the radio communication device housing;

a first leg member extending outward from said first portion for insertion into the opening;

a second leg member extending outward from said first portion for insertion into the opening; and at least one flange carried on at least one of said first and second leg members, said at least one flange for engaging the at least one tab to prevent rotation of said RF test connector plug within the opening.

2. A wireless telephone, comprising:

a housing;

an antenna positioned on said housing;

a radio frequency (RF) test connector positioned on said housing for accessing said antenna and testing an antenna connection;

an opening in said housing for accessing said RF test connector;

a first tab and a second tab positioned adjacent to said opening; and an RF test connector plug including a first portion shaped to conform to a curvature of an outer surface of said radio communication device housing whereby said first portion provides a conforming surface for closing said opening in said radio communication device housing, a first leg member extending outward from said first portion, a first flange carried on said first leg member, said first leg and flange for insertion into said opening, a second leg member extending outward from said first portion, a second flange carried on said second leg member, said second leg and flange for insertion into said opening, wherein said first tab and said second tab, along with said first leg member and said second leg member, form a channel for receiving said antenna, and wherein said RF test connector plug is inserted within said opening and rotated to position with said first and second flanges against said first tab and said second tab, respectively, to position said first and second leg members along said antenna to prevent removal of said RF test connector plug from said opening.

3. The wireless telephone of claim 2, wherein said first flange and said second flange are positioned over said first tab and said second tab, respectively, when said first tab and said second tab are positioned within said first slot and said second slot, respectively.

4. The test connector plug of claim 1, wherein each leg includes a respective flange to abut with respective tabs in the housing.

5. The test connector plug as defined in claim 4, wherein each flange has an arcuate outer surface.

6. The test connector plug as defined in claim 1, wherein said first and second leg members are spaced from one another and define a channel for receipt of the antenna between said first and second leg members.

* * * * *